(12) United States Patent
Bankoski et al.

(10) Patent No.: US 8,780,996 B2
(45) Date of Patent: Jul. 15, 2014

(54) SYSTEM AND METHOD FOR ENCODING AND DECODING VIDEO DATA

(75) Inventors: James Bankoski, Mountain View, CA (US); Paul Wilkins, Cambridge (GB); Yaowu Xu, San Diego, CA (US)

(73) Assignee: Google, Inc., Mountain View, CA (US)

( * ) Notice: Subject to any disclaimer, the term of this patent is extended or adjusted under 35 U.S.C. 154(b) by 227 days.

(21) Appl. No.: 13/081,543

(22) Filed: Apr. 7, 2011

(65) Prior Publication Data

US 2012/0257679 A1    Oct. 11, 2012

(51) Int. Cl.
| | |
|---|---|
| *H04N 7/26* | (2006.01) |
| *G06K 9/00* | (2006.01) |
| *G06K 9/40* | (2006.01) |
| *G06K 7/14* | (2006.01) |

(52) U.S. Cl.
CPC ... *H04N 7/26* (2013.01); *G06K 9/00* (2013.01)
USPC ........................ 375/240.24; 382/275; 382/183

(58) Field of Classification Search
CPC . H04B 1/66; H04N 7/26888; H04N 7/26058; H04N 7/50; H04N 7/26244; H04N 7/26382
USPC ............ 375/240, E07.027, E07.193, 240.01, 375/240.11–240.29; 382/233, 260, 382/262–625, 168, 255, 238, 100, 162, 382/183; 348/624, 625, 673, 433–458, 414, 348/231.99, E05.024
See application file for complete search history.

(56) References Cited

U.S. PATENT DOCUMENTS

| | | | |
|---|---|---|---|
| 3,825,832 A | 7/1974 | Frei et al. | |
| 4,710,810 A | 12/1987 | Koga | |
| 4,719,642 A | 1/1988 | Lucas | |
| 4,729,127 A | 3/1988 | Chan et al. | |

(Continued)

FOREIGN PATENT DOCUMENTS

| | | |
|---|---|---|
| EP | 0634873 | 1/1995 |
| EP | 1351510 | 10/2003 |

(Continued)

OTHER PUBLICATIONS

Sye-Hoon Oh, et al. "An Adaptive Sharpening Filter Using Quantization Step Size and Pixel Variance in H.264/AVC", Consumer Electronics (ICCE), IEEE International Conference on Jan. 9, 2011.

(Continued)

*Primary Examiner* — Dave Czekaj
*Assistant Examiner* — Dramos I Kalapodas
(74) *Attorney, Agent, or Firm* — Young, Basile, Hanlon & MacFarlane, P.C.

(57) ABSTRACT

A method for encoding and decoding a video signal having frames with blocks comprised of pixels. The method reduces the complexity of the video signal to be encoded by applying a filter scheme to the input data stream in an encoder and later reversing the filter scheme in a decoder. A number of filter schemes may be tested to determine the best filter scheme that most reduces the number of distinct color values per color plane. The best filter scheme is used to filter the data to be encoded. Filter information of the best filter scheme is included in the encoded data to enable the decoder to identify the best filter scheme in order to apply the best filter scheme in reverse to re-create the original data stream.

20 Claims, 7 Drawing Sheets

(56) References Cited

U.S. PATENT DOCUMENTS

| | | | |
|---|---|---|---|
| 4,736,446 | A | 4/1988 | Reynolds et al. |
| 4,816,906 | A | 3/1989 | Kummerfeldt et al. |
| 4,868,764 | A | 9/1989 | Richards |
| 4,891,748 | A | 1/1990 | Mann |
| 4,924,310 | A | 5/1990 | von Brandt |
| 5,068,724 | A | 11/1991 | Krause et al. |
| 5,083,214 | A | 1/1992 | Knowles |
| 5,091,782 | A | 2/1992 | Krause et al. |
| 5,136,371 | A | 8/1992 | Savatier et al. |
| 5,136,376 | A | 8/1992 | Yagasaki et al. |
| 5,148,269 | A | 9/1992 | de Haan et al. |
| 5,164,819 | A | 11/1992 | Music |
| 5,270,812 | A | 12/1993 | Richards |
| 5,274,442 | A | 12/1993 | Murakami et al. |
| 5,278,647 | A | 1/1994 | Hingorani et al. |
| 5,313,306 | A | 5/1994 | Kuban et al. |
| 5,337,086 | A | 8/1994 | Fujinami |
| 5,341,440 | A | 8/1994 | Earl et al. |
| 5,365,280 | A | 11/1994 | De Haan et al. |
| 5,377,018 | A | 12/1994 | Rafferty |
| 5,398,068 | A | 3/1995 | Liu et al. |
| 5,432,870 | A | 7/1995 | Schwartz |
| 5,457,780 | A | 10/1995 | Shaw et al. |
| 5,461,423 | A | 10/1995 | Tsukagoshi |
| 5,488,570 | A | 1/1996 | Agarwal |
| 5,512,952 | A | 4/1996 | Iwamura |
| 5,561,477 | A | 10/1996 | Polit |
| 5,568,200 | A | 10/1996 | Pearlstein et al. |
| 5,576,767 | A | 11/1996 | Lee et al. |
| 5,579,348 | A | 11/1996 | Walker et al. |
| 5,623,308 | A | 4/1997 | Civanlar et al. |
| 5,629,736 | A | 5/1997 | Haskell et al. |
| 5,640,208 | A | 6/1997 | Fujinami |
| 5,686,962 | A | 11/1997 | Chung et al. |
| 5,689,306 | A | 11/1997 | Jung |
| 5,706,059 | A | 1/1998 | Ran et al. |
| 5,717,791 | A | 2/1998 | Labaere et al. |
| 5,721,822 | A | 2/1998 | Agarwal |
| 5,731,840 | A | 3/1998 | Kikuchi et al. |
| 5,734,744 | A | 3/1998 | Wittenstein et al. |
| 5,737,020 | A | 4/1998 | Hall et al. |
| 5,748,242 | A | 5/1998 | Podilchuk |
| 5,748,249 | A | 5/1998 | Fujiwara |
| 5,767,909 | A | 6/1998 | Jung |
| 5,774,593 | A | 6/1998 | Zick et al. |
| 5,812,197 | A | 9/1998 | Chan et al. |
| 5,818,536 | A | 10/1998 | Morris et al. |
| 5,818,969 | A | 10/1998 | Astle |
| 5,828,370 | A | 10/1998 | Moeller et al. |
| 5,886,742 | A | 3/1999 | Hibi et al. |
| 5,903,264 | A | 5/1999 | Moeller et al. |
| 5,912,707 | A | 6/1999 | Kim |
| 5,926,226 | A | 7/1999 | Proctor et al. |
| 5,929,940 | A | 7/1999 | Jeannin |
| 5,930,493 | A | 7/1999 | Ottesen et al. |
| 5,946,414 | A * | 8/1999 | Cass et al. .................. 382/183 |
| 5,959,672 | A | 9/1999 | Sasaki |
| 5,963,203 | A | 10/1999 | Goldberg et al. |
| 5,985,526 | A | 11/1999 | Tutt et al. |
| 5,987,866 | A | 11/1999 | Weeger et al. |
| 5,991,447 | A | 11/1999 | Eifrig et al. |
| 5,999,641 | A | 12/1999 | Miller et al. |
| 6,005,980 | A | 12/1999 | Eifrig et al. |
| 6,014,706 | A | 1/2000 | Cannon et al. |
| 6,041,145 | A | 3/2000 | Hayashi et al. |
| 6,061,397 | A | 5/2000 | Ogura |
| 6,084,908 | A | 7/2000 | Chiang et al. |
| 6,097,842 | A | 8/2000 | Suzuki et al. |
| 6,100,940 | A | 8/2000 | Dieterich |
| 6,108,383 | A | 8/2000 | Miller et al. |
| 6,112,234 | A | 8/2000 | Leiper |
| 6,115,501 | A | 9/2000 | Chun et al. |
| 6,119,154 | A | 9/2000 | Weaver et al. |
| 6,125,144 | A | 9/2000 | Matsumura et al. |
| 6,141,381 | A | 10/2000 | Sugiyama |
| 6,167,164 | A | 12/2000 | Lee |
| 6,181,822 | B1 | 1/2001 | Miller et al. |
| 6,185,363 | B1 | 2/2001 | Dimitrova et al. |
| 6,188,799 | B1 | 2/2001 | Tan et al. |
| 6,201,896 | B1 | 3/2001 | Ishikawa |
| 6,212,234 | B1 | 4/2001 | Andoh et al. |
| 6,233,279 | B1 | 5/2001 | Boon |
| 6,240,135 | B1 | 5/2001 | Kim |
| 6,272,179 | B1 | 8/2001 | Kadono |
| 6,277,075 | B1 * | 8/2001 | Torp et al. .................. 600/443 |
| 6,285,801 | B1 | 9/2001 | Mancuso et al. |
| 6,289,049 | B1 | 9/2001 | Kim et al. |
| 6,292,837 | B1 | 9/2001 | Miller et al. |
| 6,327,304 | B1 | 12/2001 | Miller et al. |
| 6,359,929 | B1 | 3/2002 | Boon |
| 6,370,267 | B1 | 4/2002 | Miller et al. |
| 6,381,277 | B1 | 4/2002 | Chun et al. |
| 6,389,072 | B1 | 5/2002 | Tzou et al. |
| 6,400,763 | B1 | 6/2002 | Wee |
| 6,414,995 | B2 | 7/2002 | Okumura et al. |
| 6,418,166 | B1 | 7/2002 | Wu et al. |
| 6,431,197 | B2 | 8/2002 | Hintzman et al. |
| 6,434,197 | B1 | 8/2002 | Wang et al. |
| 6,473,463 | B2 | 10/2002 | Agarwal |
| 6,501,860 | B1 | 12/2002 | Charrier et al. |
| 6,522,784 | B1 | 2/2003 | Zlotnick |
| 6,529,638 | B1 | 3/2003 | Westerman |
| 6,560,366 | B1 | 5/2003 | Wilkins |
| 6,570,924 | B1 | 5/2003 | Lynch et al. |
| 6,621,867 | B1 | 9/2003 | Sazzad et al. |
| 6,661,842 | B1 | 12/2003 | Abousleman |
| 6,687,303 | B1 | 2/2004 | Ishihara |
| 6,697,061 | B1 | 2/2004 | Wee et al. |
| 6,707,952 | B1 | 3/2004 | Tan et al. |
| 6,735,249 | B1 | 5/2004 | Karczewicz et al. |
| 6,765,964 | B1 | 7/2004 | Conklin |
| 6,798,837 | B1 | 9/2004 | Uenoyama et al. |
| 6,807,317 | B2 | 10/2004 | Mathew et al. |
| 6,826,229 | B2 | 11/2004 | Kawashima et al. |
| 6,904,096 | B2 | 6/2005 | Kobayashi et al. |
| 6,907,079 | B2 | 6/2005 | Gomila et al. |
| 6,934,419 | B2 | 8/2005 | Zlotnick |
| 7,027,654 | B1 | 4/2006 | Ameres et al. |
| 7,054,367 | B2 | 5/2006 | Oguz et al. |
| 7,088,351 | B2 | 8/2006 | Wang |
| 7,116,831 | B2 | 10/2006 | Mukerjee et al. |
| 7,120,197 | B2 | 10/2006 | Lin et al. |
| 7,170,937 | B2 | 1/2007 | Zhou |
| 7,194,036 | B1 | 3/2007 | Melanson |
| 7,226,150 | B2 | 6/2007 | Yoshimura et al. |
| 7,236,524 | B2 | 6/2007 | Sun et al. |
| 7,260,148 | B2 | 8/2007 | Sohm |
| 7,277,592 | B1 | 10/2007 | Lin |
| 7,330,509 | B2 | 2/2008 | Lu et al. |
| 7,358,881 | B2 | 4/2008 | Melanson |
| 7,447,337 | B2 | 11/2008 | Zhang et al. |
| 7,492,823 | B2 | 2/2009 | Lee et al. |
| 7,499,492 | B1 | 3/2009 | Ameres et al. |
| 7,590,179 | B2 | 9/2009 | Mukerjee |
| 7,606,310 | B1 | 10/2009 | Ameres et al. |
| 7,627,040 | B2 | 12/2009 | Woods et al. |
| 7,657,098 | B2 | 2/2010 | Lin et al. |
| 7,751,514 | B2 | 7/2010 | Tsuie et al. |
| 7,916,783 | B2 | 3/2011 | Gao et al. |
| 8,111,914 | B2 | 2/2012 | Lee et al. |
| 2001/0022815 | A1 | 9/2001 | Agarwal |
| 2002/0031272 | A1 | 3/2002 | Bagni et al. |
| 2002/0036705 | A1 | 3/2002 | Lee et al. |
| 2002/0064228 | A1 | 5/2002 | Sethuraman et al. |
| 2002/0071485 | A1 | 6/2002 | Caglar et al. |
| 2002/0094130 | A1 * | 7/2002 | Bruls et al. .................. 382/261 |
| 2002/0141501 | A1 | 10/2002 | Krishnamachari |
| 2002/0159524 | A1 | 10/2002 | Gunter et al. |
| 2002/0168114 | A1 | 11/2002 | Valente |
| 2002/0172431 | A1 * | 11/2002 | Atkins et al. .................. 382/260 |
| 2002/0176502 | A1 | 11/2002 | Rose et al. |
| 2003/0023982 | A1 | 1/2003 | Lee et al. |
| 2003/0039310 | A1 | 2/2003 | Wu et al. |
| 2003/0053708 | A1 | 3/2003 | Kryukov et al. |

(56) References Cited

U.S. PATENT DOCUMENTS

| | | |
|---|---|---|
| 2003/0053711 A1 | 3/2003 | Kim |
| 2003/0081850 A1 | 5/2003 | Karczewicz et al. |
| 2003/0165331 A1 | 9/2003 | Van Der Schaar |
| 2003/0189982 A1 | 10/2003 | MacInnis |
| 2003/0194009 A1 | 10/2003 | Srinivasan |
| 2003/0215014 A1 | 11/2003 | Koto et al. |
| 2004/0013308 A1 | 1/2004 | Jeon et al. |
| 2004/0017939 A1 | 1/2004 | Mehrotra |
| 2004/0042549 A1 | 3/2004 | Huang et al. |
| 2004/0062307 A1 | 4/2004 | Hallapuro et al. |
| 2004/0080669 A1 | 4/2004 | Nagai et al. |
| 2004/0120400 A1 | 6/2004 | Linzer |
| 2004/0179610 A1 | 9/2004 | Lu et al. |
| 2004/0181564 A1 | 9/2004 | MacInnis et al. |
| 2004/0184533 A1 | 9/2004 | Wang |
| 2004/0228410 A1 | 11/2004 | Ameres et al. |
| 2004/0240556 A1 | 12/2004 | Winger et al. |
| 2005/0013494 A1 | 1/2005 | Srinivasan et al. |
| 2005/0053294 A1 | 3/2005 | Mukerjee et al. |
| 2005/0117653 A1 | 6/2005 | Sankaran |
| 2005/0135699 A1* | 6/2005 | Anderson ............... 382/261 |
| 2005/0147165 A1 | 7/2005 | Yoo et al. |
| 2005/0169374 A1 | 8/2005 | Marpe et al. |
| 2005/0196063 A1 | 9/2005 | Guangxi et al. |
| 2005/0265447 A1 | 12/2005 | Park |
| 2005/0276323 A1 | 12/2005 | Martemyanov et al. |
| 2005/0286629 A1 | 12/2005 | Dumitras et al. |
| 2006/0013315 A1 | 1/2006 | Song |
| 2006/0062311 A1 | 3/2006 | Sun et al. |
| 2006/0093038 A1 | 5/2006 | Boyce |
| 2006/0098737 A1 | 5/2006 | Sethuraman et al. |
| 2006/0098738 A1 | 5/2006 | Cosman et al. |
| 2006/0126962 A1 | 6/2006 | Sun |
| 2006/0153301 A1 | 7/2006 | Guleryuz |
| 2006/0182181 A1 | 8/2006 | Lee et al. |
| 2006/0215758 A1 | 9/2006 | Kawashima |
| 2006/0239345 A1 | 10/2006 | Taubman et al. |
| 2007/0009044 A1 | 1/2007 | Tourapis et al. |
| 2007/0009171 A1 | 1/2007 | Nakashizuka et al. |
| 2007/0025448 A1 | 2/2007 | Cha et al. |
| 2007/0047648 A1 | 3/2007 | Tourapis et al. |
| 2007/0081593 A1 | 4/2007 | Jeong et al. |
| 2007/0098067 A1 | 5/2007 | Kim et al. |
| 2007/0110152 A1 | 5/2007 | Lee et al. |
| 2007/0140342 A1 | 6/2007 | Karczewicz et al. |
| 2007/0153899 A1 | 7/2007 | Koto et al. |
| 2007/0171988 A1 | 7/2007 | Panda et al. |
| 2007/0177673 A1 | 8/2007 | Yang |
| 2007/0189735 A1 | 8/2007 | Kawashima et al. |
| 2007/0201559 A1 | 8/2007 | He |
| 2007/0230572 A1 | 10/2007 | Koto et al. |
| 2007/0237241 A1 | 10/2007 | Ha et al. |
| 2007/0253490 A1 | 11/2007 | Makino |
| 2007/0253491 A1 | 11/2007 | Ito et al. |
| 2007/0274385 A1 | 11/2007 | He |
| 2007/0274388 A1 | 11/2007 | Lee et al. |
| 2008/0025398 A1 | 1/2008 | Molloy et al. |
| 2008/0025411 A1 | 1/2008 | Chen et al. |
| 2008/0101469 A1* | 5/2008 | Ishtiaq et al. ............ 375/240.13 |
| 2008/0130755 A1 | 6/2008 | Loukas et al. |
| 2008/0159649 A1* | 7/2008 | Kempf et al. ................. 382/275 |
| 2008/0170629 A1 | 7/2008 | Shim et al. |
| 2008/0198931 A1 | 8/2008 | Chappalli et al. |
| 2008/0212678 A1 | 9/2008 | Booth et al. |
| 2008/0219351 A1 | 9/2008 | Kim et al. |
| 2008/0279279 A1 | 11/2008 | Liu et al. |
| 2008/0298472 A1 | 12/2008 | Jain et al. |
| 2009/0003717 A1* | 1/2009 | Sekiguchi et al. ............ 382/238 |
| 2009/0034617 A1 | 2/2009 | Tanaka |
| 2009/0161770 A1 | 6/2009 | Dong et al. |
| 2009/0196351 A1* | 8/2009 | Cho et al. ................. 375/240.13 |
| 2009/0287493 A1 | 11/2009 | Janssen et al. |
| 2009/0316793 A1 | 12/2009 | Yang et al. |
| 2010/0022815 A1 | 1/2010 | Chikamatsu et al. |
| 2010/0034268 A1 | 2/2010 | Kusakabe et al. |
| 2011/0007799 A1 | 1/2011 | Karczewicz et al. |
| 2011/0141237 A1* | 6/2011 | Cheng et al. ..................... 348/46 |
| 2011/0229029 A1* | 9/2011 | Kass ............................. 382/168 |
| 2012/0081566 A1* | 4/2012 | Cote et al. ................. 348/222.1 |
| 2012/0081580 A1* | 4/2012 | Cote et al. ............... 348/231.99 |

FOREIGN PATENT DOCUMENTS

| | | |
|---|---|---|
| EP | 1555832 | 7/2005 |
| EP | 1840875 | 3/2007 |
| EP | 1838108 | 9/2007 |
| EP | 1922566 | 5/2008 |
| JP | 61092073 | 5/1986 |
| JP | 2217088 | 8/1990 |
| JP | 2272970 | 11/1990 |
| JP | 8280032 | 10/1996 |
| JP | 09037246 | 7/1997 |
| JP | 09179987 | 7/1997 |
| JP | 11262018 | 9/1999 |
| JP | 11289544 | 10/1999 |
| JP | 11313332 | 11/1999 |
| JP | 11513205 | 11/1999 |
| JP | 2002141806 | 5/2002 |
| JP | 2003046944 | 2/2003 |
| JP | 2003235044 | 8/2003 |
| JP | 2005503737 | 2/2005 |
| JP | 2005308623 | 11/2005 |
| KR | 100213018 | 8/1990 |
| KR | 20010030916 | 4/2001 |
| WO | WO9904574 | 1/1999 |
| WO | WO0150770 | 7/2001 |
| WO | WO02089487 | 11/2002 |
| WO | WO03026315 | 3/2003 |
| WO | WO2006602377 | 6/2006 |
| WO | WO2006083614 | 8/2006 |
| WO | WO2007052303 | 5/2007 |
| WO | WO2008005124 | 1/2008 |
| WO | WO2010/123855 | 10/2010 |

OTHER PUBLICATIONS

International Search Report and Written Opinion for International Patent Application PCT/US2012/031513; dated Jun. 15, 2012.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced

(56) References Cited

OTHER PUBLICATIONS video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
A High Efficient Method for Parallelizing Reconstructor & Loop Deblocking Filter on Multi-core Processor Platform.
An Optimized In-Loop H.264 De-Blocking Filter on Multi-Core Engines.
Architectures for Efficient Partitioning of Video Coding Algorithms—H. 264 decoder.
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.
Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.
Ebrahimi, Touradj, et al.; "Joint motion estimation and segmentation for very low bitrate video coding", SPIE vol. 2501, 1995, 12 pp.
Guillotel, Philippe, et al.; "Comparison of motion vector coding techniques", SPIE vol. 2308, 1994, 11 pp.
International Telecommunications Union, ITU-T, Telecommunication Standardization Section of ITU, "Series H: Audiovisual and Multimedia Systems, Infrastructure of audiovisual services—Coding of moving video", Mar. 2010, 676 pp.
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Lee, Yung-Lyul; Park, Hyun Wook; "Loop Filtering and Post-Filtering for Low-Bit-Rates Moving Picture Coding", Signal Processing: Image Communication 16 (2001) pp. 871-890.
Lihua Zhu, Guangfei Zhu, Charles Wang; Implementation of video deblocking filter on GPU Apr. 8, 2008.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Method for unloading YUV-filtered pixels from a deblocking filter for a video decoder, Oct. 11, 2006.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
ON2 Technologies Inc., White Paper TrueMotion VP7 Video Codec, Jan. 10, 2005, 13 pages, Document Version: 1.0, Clifton Park, New York.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Sikora, T. et al., Shape-adaptive DCT for generic coding of video, Circuits and Systems for Video Technology, IEEE Transactions on vol. 5, Issue 1, p. 59-62, Feb. 1, 1995.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Wenger et al.; RTP Payload Format for H.264 Video; The Internet Society; 2005.
Wiegand et al, "Overview of the H 264/AVC Video Coding Standard," IEEE Transactions on Circuits and Systems for Video Technology, vol. 13, No. 7, pp. 568, 569, Jul. 1, 2003.
Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.
Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wright, R. Glenn, et al.; "Multimedia—Electronic Technical Manual for ATE", IEEE 1996, 3 pp.
Wu, Yaowu; "InsideWebM Technology: The VP8 Alternate Reference Frame"; http://blog.webmproject.org/2010/05/inside-webm-technol ogy-vp8-a1lternate.html dated May 27, 2010.
Zhang, Kui, et al.; "Variable Block Size Video Coding With Motion Prediction and Motion Segmentation", SPIE vol. 2419, 1995, 9 pp.
Zhi Liu, Zhaoyang Zhang, Liquan Shen, Mosaic Generation in H.264 Compressed Domain, IEEE 2006.
Mohmoudi, Mona et al.; "Fast Image and video Denoising via Nonlocal Means of Similar Neighborhoods"; IEEE Signal Processing Letters vol. 12, No. 12, Dec. 2005.

* cited by examiner

SYSTEM AND METHOD FOR ENCODING AND DECODING VIDEO DATA

TECHNICAL FIELD

The present invention relates in general encoding and decoding video data.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit higher quality transmission of video while limiting bandwidth consumption, a number of video compression schemes are noted including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes generally break the image up into blocks and use one or more techniques to limit the amount of information included in a resulting digital video bitstream for transmission. The bitstream, once received, is then decoded to re-create the blocks and the source images from the limited information.

SUMMARY

Systems and methods for encoding and decoding a video signal are disclosed. In accordance with one aspect of the disclosed embodiments, a method is provided for encoding video data. The method includes applying a plurality of filter schemes to at least a portion of the data to generate a plurality of filter outputs, each filter output having data indicating the color values included in the filter output. The method also includes determining the color variance of at least some of the plurality of filter outputs using a processor. The method further includes selecting at least one of the plurality of filter schemes based on the color variance of the filter output generated using the selected filter scheme.

In accordance with another aspect of the disclosed embodiments, a method is provided for encoding data representing an image that is intended for display on a computer monitor. The method includes applying a plurality of filter schemes to at least a portion of the data to generate a plurality of filter outputs. The method also includes identifying at least one filter output that has a low color variance relative to the other filter outputs using a processor. The method further includes selecting that one of the filter outputs having the low color variance; and encoding the selected filter output.

In accordance with another aspect of the disclosed embodiments, a method is provided for decoding a data stream representing a video image. The method includes identifying, within the data stream, filter information indicative of the filter scheme applied to the data during encoding, selecting an anti-aliasing filter based on the filter information using a processor, and filtering the data using the selected anti-aliasing filter.

In accordance with another aspect of the disclosed embodiments, a method is provided for reducing the complexity of a data stream to be encoded. The method includes (1) identifying at least one target block from the data stream, (2) obtaining an original set of color values that contains each distinct color value used in the at least one target block, (3) applying a plurality of filter schemes to the at least one target block to generate a plurality of filter outputs using a processor, (4) determining a filtered set of color values for each of the plurality of filter outputs, each filtered set of color values containing each distinct color value used in its associated filter output, and (5) selecting the filter scheme of the filter output that most reduces the complexity of the at least one target block.

In accordance with another aspect of the disclosed embodiments, an apparatus for encoding video is provided including a processor and a memory. The processor is configured to (1) apply a plurality of filter schemes to at least a portion of the data stored in memory to generate a plurality of filter outputs, each filter output having data indicating the color values included in the filter output, (2) determining the color variance of at least some of the plurality of filter outputs, and (3) selecting at least one of the plurality of filter schemes based on the color variance of the filter output generated using the selected filter scheme.

In accordance with another aspect of the disclosed embodiments, an apparatus for decoding video data is provided including a processor and a memory. The processor is configured to (1) identify, within the data stream, filter information indicative of the filter scheme applied to the data during encoding, (2) select an anti-aliasing filter based on the filter information, and (3) filter the data using the selected anti-aliasing filter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
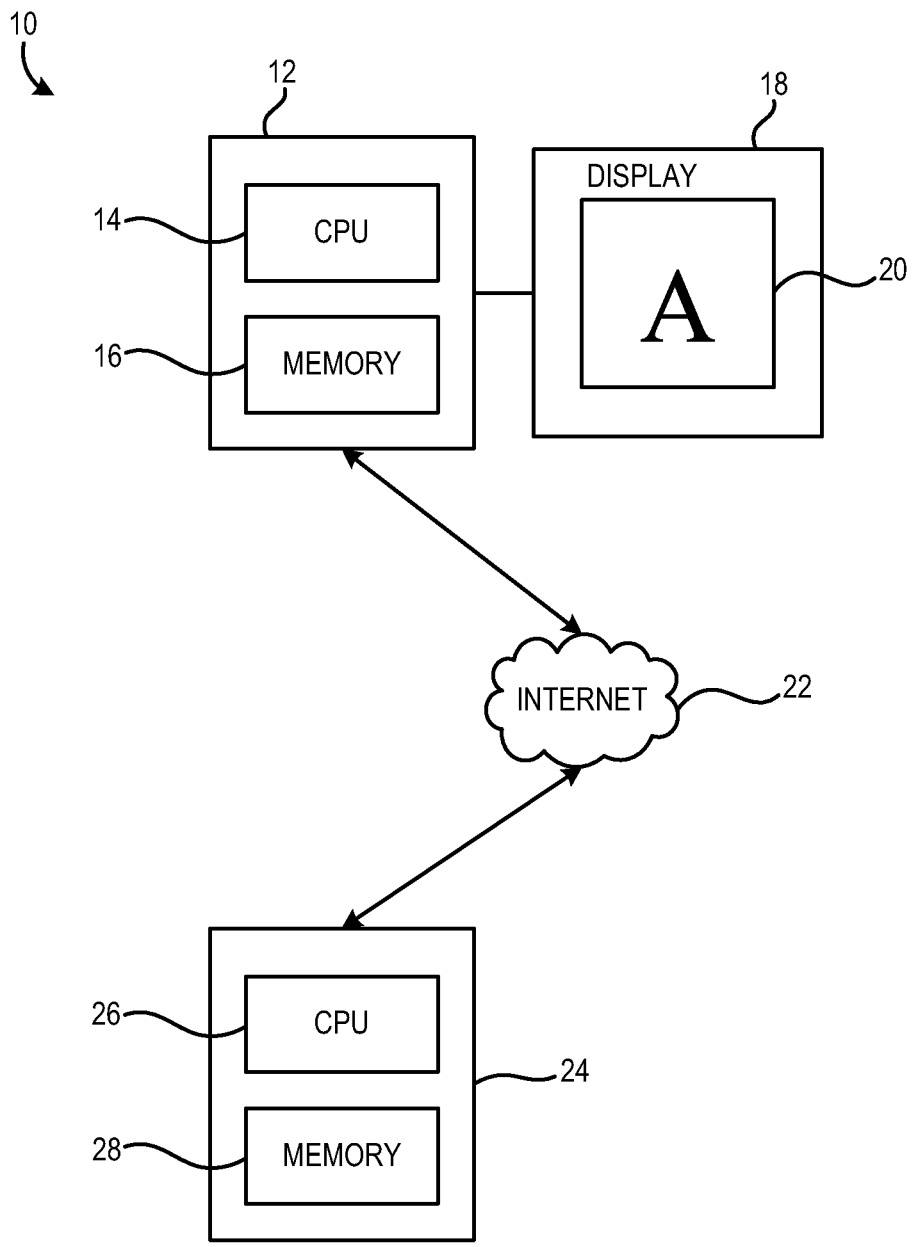
FIG. 1 is a diagram of an encoder and decoder system in accordance with one embodiment.

FIG. 1 is a diagram of an encoder and decoder system 10 for still or dynamic video images. An exemplary transmitting station 12 may be, for example, a computer having an internal configuration of hardware including a central processing unit (CPU) 14 and memory 16. The CPU 14 is a controller for controlling the operations of transmitting station 12. The CPU 14 is connected to memory 16 by, for example, a memory bus. The memory 16 may be random access memory (RAM) although any other type of storage can be used. The memory 16 stores data and program instructions which are used by the CPU 14. The memory 16 can be in the same chip or machine as CPU 14 or located in a separate unit that is coupled to CPU 14 to form an apparatus. Other suitable implementations of transmitting station 12 are possible such as those explained later.

A display 18 configured to display still or dynamic video images is connected to transmitting station 12. The display 18 may be implemented in various ways, including by a liquid crystal display (LCD) or a cathode-ray tube (CRT). The display 18 may also be configured for other uses, such as screen-casting. The display 18 can display an anti-aliased image 20, which in this case is demonstrated by an image of a character glyph "A."

A network 22 connects the transmitting station 12 and a receiving station 24. The network 22 may, for example, be what is commonly known as the internet. The network 22 may also be a local area network (LAN), wide area network (WAN), virtual private network (VPN), or any other means of transferring data between transmitting station 12 and receiving station 24.

The exemplary receiving station 24 may be a computer having an internal configuration of hardware include a central processing unit (CPU) 26 and a memory 28. The CPU 26 is a controller for controlling the operations of transmitting station 12. The CPU 26 is connected to memory 28 by, for example, a memory bus. The memory 28 may be random access memory (RAM). The memory 28 stores data and program instructions which are used by the CPU 26. Other suitable implementations of receiving station 24 are possible such as those explained later.

Figure 2:
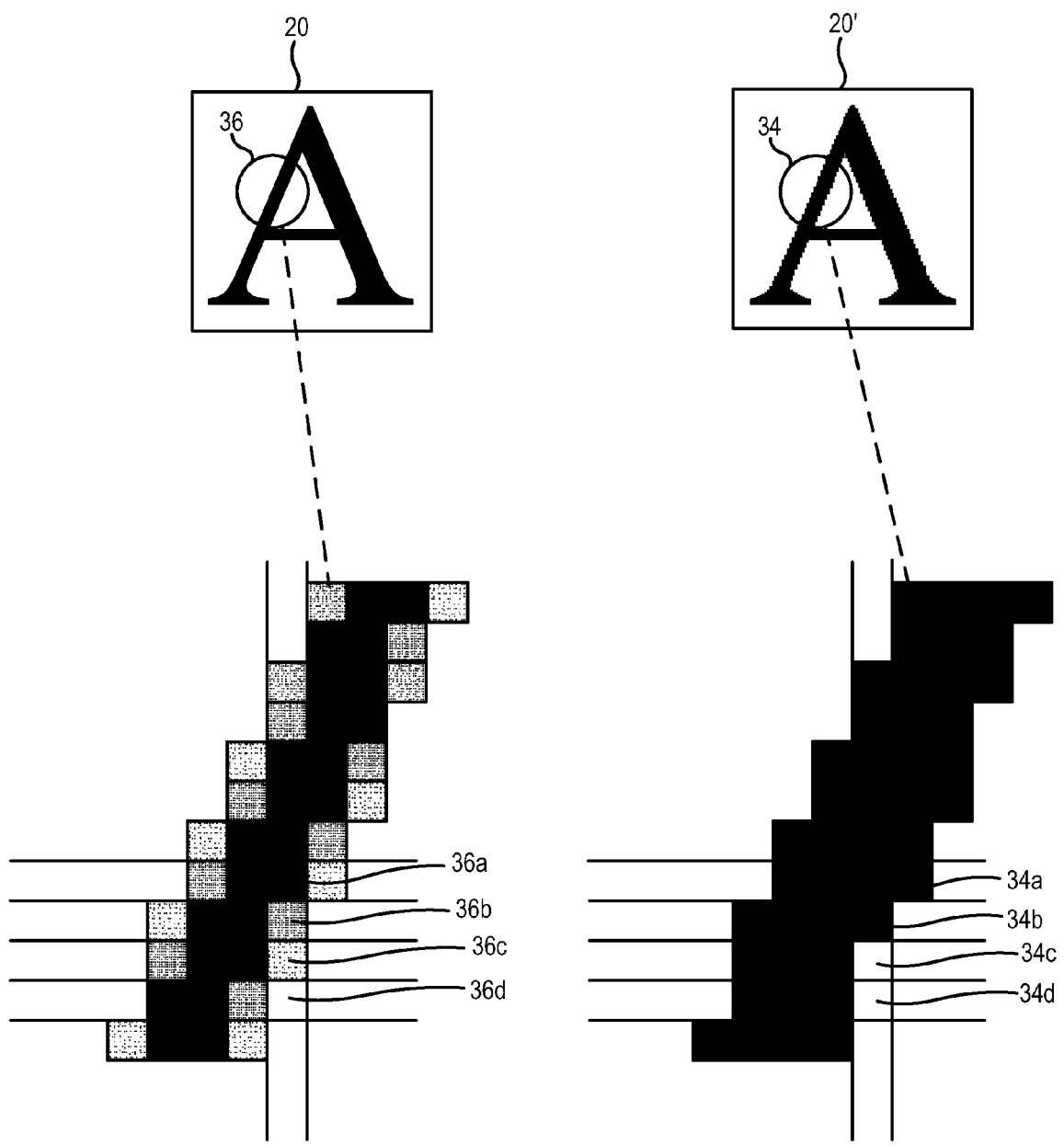
FIG. 2 are exemplary specimens of an anti-aliased image and a rasterized image.

FIG. 2 shows enlarged exemplary specimens of the anti-aliased image 20 and the rasterized image 20' that anti-aliased image 20 is derived from. As is apparent, the rasterized image 20' appears "jagged" at its edges whereas the anti-aliased image 20 does not. Anti-aliasing techniques are typically employed to avoid the "jagged" appearance of rasterized images and are typically associated with images of character glyphs, but may be applied to other images as will be apparent to those skilled in the art. Anti-aliasing is only an exemplary method of smoothing rasterized image 20'. Other techniques similar to or that are a subset of anti-aliasing will be apparent to those skilled in the art. For example, subpixel rendering may be utilized. Typically, the display 18 will include one or more anti-aliased type images such as anti-aliased image 20.

Rasterized images, such as the rasterized image 20', represent an original image (usually a vector-based character glyph) typically by assigning each pixel in the rasterized image 20' one of two color values. Each pixel in the resulting image must have a single color value even if the original character glyph has more than one color value in the area represented by the pixel (as shown in a rasterized image portion 34). For example, the areas represented by pixels 34*a-d* might each have two color values in the original character glyph. To be represented in the rasterized image, pixels 34*a-b* are represented by one color value and pixels 34*c-d* are represented by another color value.

Anti-aliased images, such as anti-aliased image 20, represent an original image by assigning each pixel various color values as determined by an anti-aliasing filter. An exemplary anti-aliasing filter can typically assign each pixel in the anti-aliased image 20 multiple shades of color values in between the two original color values in the original character glyph. An example is shown in anti-aliased image portion 36. In this example, the area represented by pixels 36*b-c* each includes two color values in the original character glyph. The pixels 36*a-d* are each represented in the anti-aliased image 20 by one of the original two color values as shown by pixels 36*a* and 36*d* and also by various shades of color values in between the original two color values as shown by pixels 36*b-c*. Anti-aliasing may be implemented using many different types of filters that may, for example, vary the shade of colors used and the number of pixels over which the anti-aliasing filter will have an effect.

Figure 3:
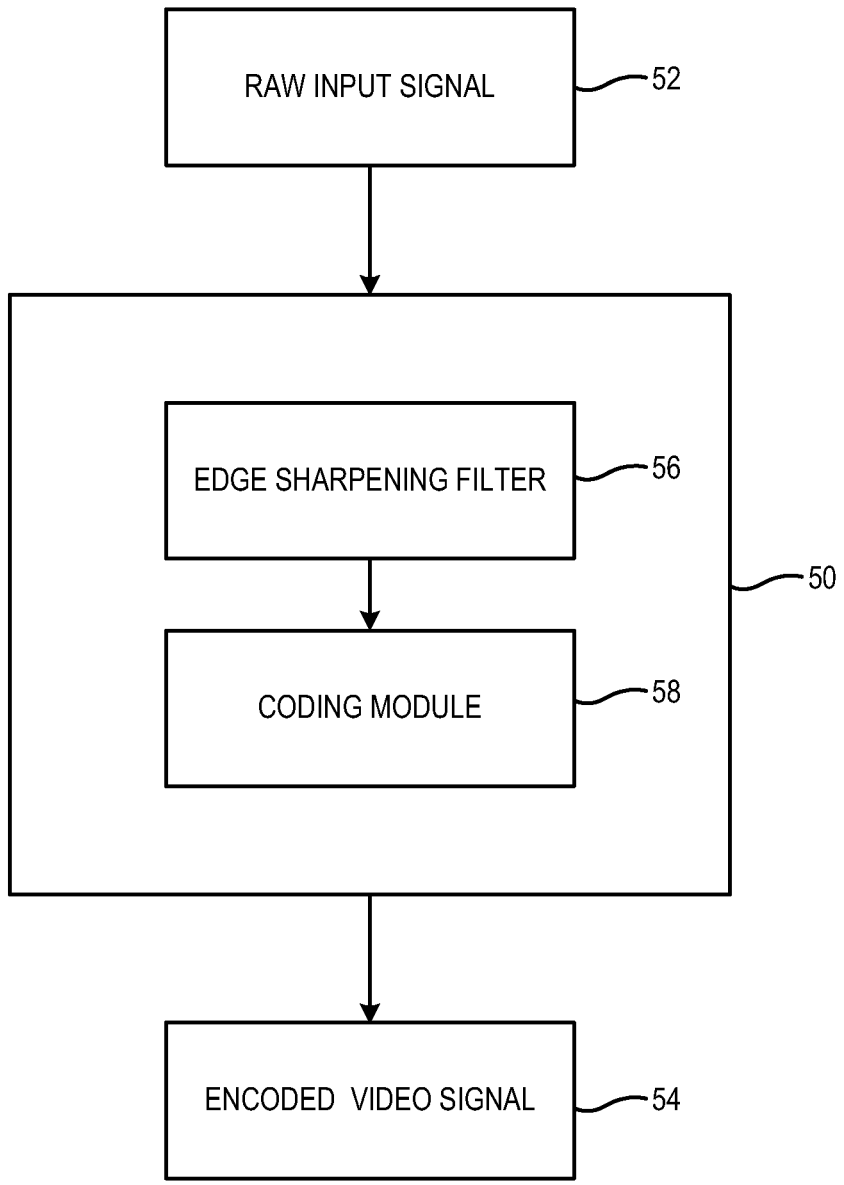
FIG. 3 is an exemplary block diagram of a encoder.

FIG. 3 shows an exemplary block diagram of an encoder 50 implemented on transmitting station 12. The encoder 50 takes a raw or uncompressed or partially compressed video signal 52 as input. Input signal 52 is, for example, the digital representation of an image to be encoded. The input signal 52 may alternatively be the representation of a video image or other analogous data. The input signal 52 will include, at least in part, an anti-aliased type image such as anti-aliased image 20.

The input signal 52 typically includes data relating to the color values of pixels of the image or video image it represents. The included pixels can be grouped into blocks, macroblocks, and frames. Blocks and macroblocks are groups of pixels found in an image, typically having dimensions of 16×16 or 8×8 pixels. However, blocks and macroblocks may be of any desirable size. Frames are a group of blocks and macroblocks that together comprise an entire image, such as the entire screen of display 18. If the input signal 52 represents a dynamic video image, it will include multiple frames, each representing a still image in the dynamic video image.

The encoder 50 produces an encoded video signal 54 as output. Encoded video signal 54 is an encoded digital representation of an image that has been encoded by encoder 50. The encoded video signal 54 is in a format suitable for transmission to the receiving station 24 via network 22.

The encoder 50 includes an edge sharpening filter 56 and an encoding module 58. Edge sharpening filter 56 selects and applies a filter scheme to a signal derived from input signal 52 with the goal of reducing the complexity of input signal 52. The complexity of input signal 52 may be decreased, for example, by reducing the color variance in the input signal 52, such as measured by the number of distinct color values included in the input signal 52. Data identifying the selected filter scheme is included in the resulting filtered signal. Details of the filter scheme are discussed in more detail later with respect to FIG. 7. The resulting filtered signal is then encoded by encoding module 58 into a signal from which the encoded video signal 54 is derived. It may be desirable for encoder operation 50 to include other modules and encoding steps in addition to those listed, such as a pre-processing module or a post-processing module.

Figure 4:
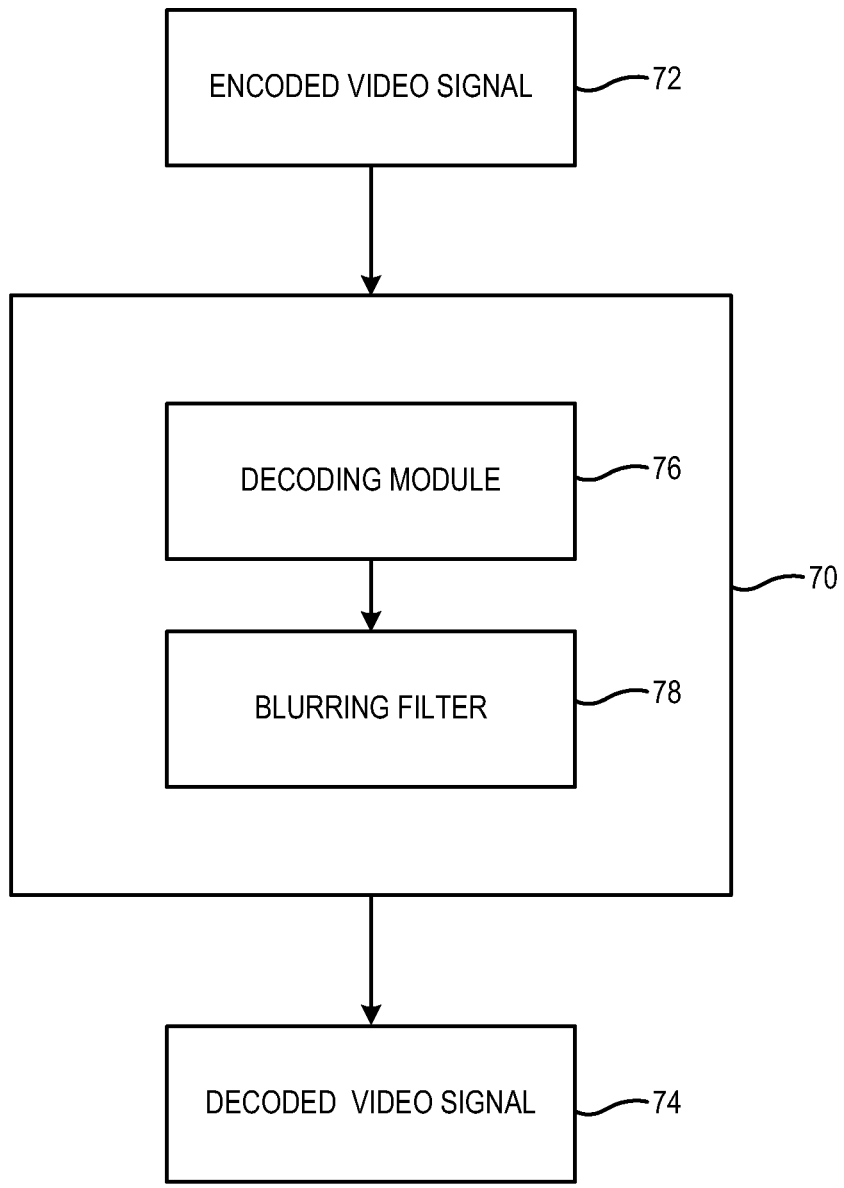
FIG. 4 is an exemplary block diagram of a decoder.

FIG. 4 shows an exemplary block diagram of a decoder 70 of receiving station 24. The decoder 70 takes an encoded video signal 72 as input. Encoded video signal 72 is an encoded digital representation of an image (input signal 52) that has previously been encoded by encoder 50 on transmitting station 12. Decoder 70 produces a decoded video signal 74 as output. Decoded video signal 74 is, for example, the digital representation of an image that was previously encoded by encoder 50. Decoded video signal 74 may alternatively be the representation of a video image or other analogous data. Decoded video signal 74 will include, at least in part, an anti-aliased type image such as anti-aliased image 20.

The decoder 70 includes a decoding module 76 and a blurring filter 78. The decoding module 76 decodes a signal derived from encoded video signal 72 into a signal comparable to the signal that existed prior to encoding by encoding module 58. A derivation of the signal decoded by decoding module 76 is then processed by the blurring filter 78. Blurring filter 78 selects a filter scheme to blur the decoded signal using the filter identification included into the signal by edge sharpening filter 56. The selected filter scheme is applied to the decoded signal, from which the decoded video signal 74 is derived by the decoder 70. Details of the filter scheme are discussed in more detail later with respect to FIG. 7.

Figure 5:
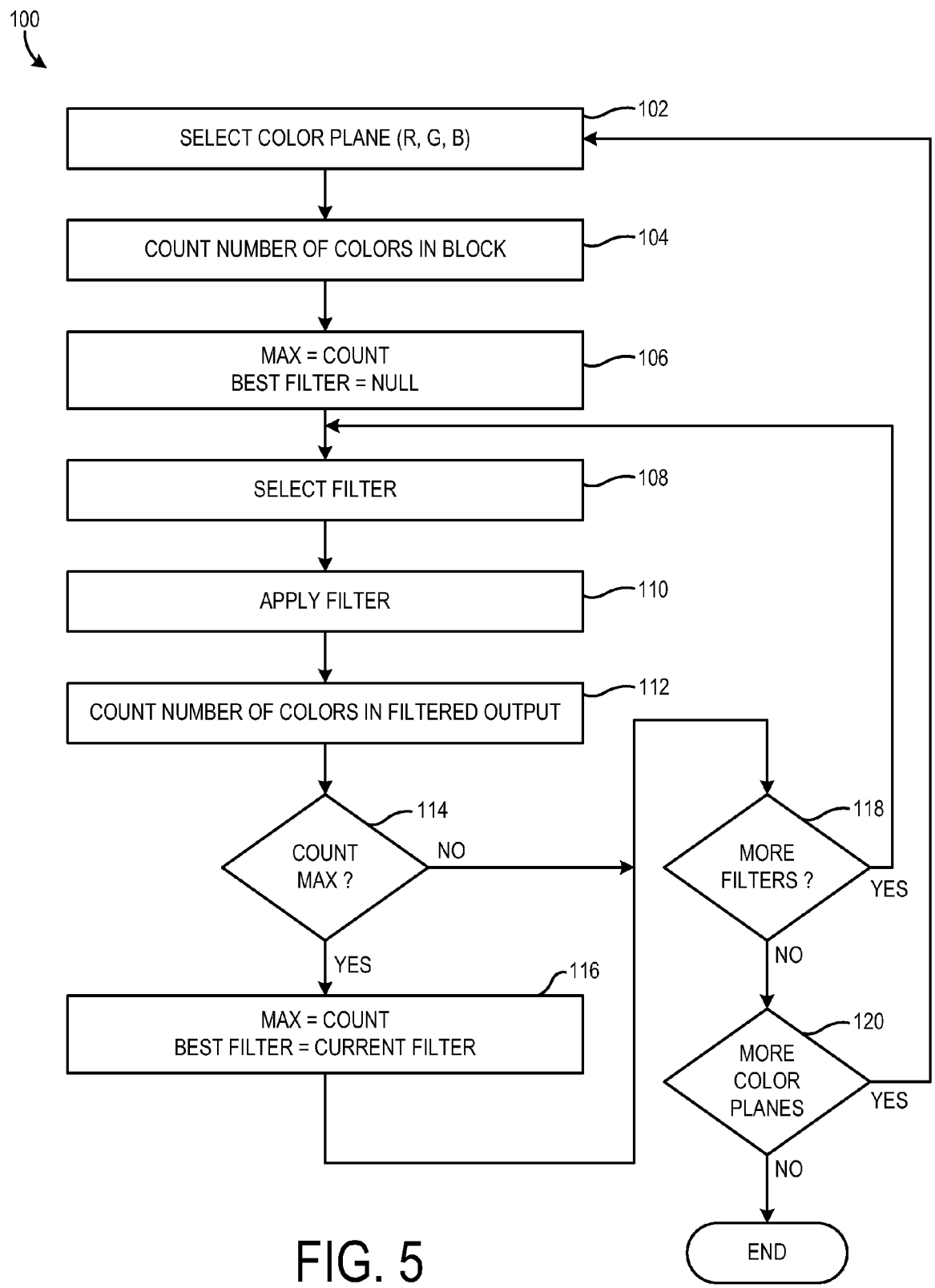
FIG. 5 is an exemplary block diagram of the edge sharpening filter of FIG. 3.

FIG. 5 shows an exemplary block diagram of the process performed by edge sharpening filter 56 on a block of pixels selected from the input signal 52 (100). The first step is to select a color plane (102). For example, a color plane may be one of red, green, or blue (RGB). Color planes may alternatively be defined using other methodologies. For example, a color plane may be one of Y' (luma), Cb (blue-difference chroma), or Cr (red-difference chroma) (YCbCr).

After the color plane is selected, the edge sharpening filter 56 then determines the color variance of the block of pixels by counting the number of distinct color values found in the block of pixels within that color plane (104). The "Max" and "Best Filter" variables are then initialized (106). Max is initialized to the count from step 104. Best Filter is initialized to nothing (NULL). As explained below, the Best Filter is the filter with the lowest color variance, which in this case is determined as the lowest count of distinct color values.

Once initialized for the color plane, the edge sharpening filter 56 selects the next available filter scheme for evaluation (108). It then applies the filter scheme to the block of pixels being processed (110). The number of distinct color values found in the filtered block of pixels is then counted (112) to determine the color variance of the filtered block. Edge sharpening filter 56 then determines whether the count from step 112 is less than the current value of Max (114). If the value is less, the currently selected filter is the best filter scheme of all of those applied at this point. If so, the variable Max is set to the count from step 112, and the variable Best Filter is set to the currently selected filter scheme. If the value is not less, then the variables are left unchanged.

Edge sharpening filter 56 then determines whether there are additional filter schemes available to be applied (118). If there are additional filter schemes available, the edge sharpening filter 56 then returns to step 108 to select the next filter scheme. Otherwise, the edge sharpening filter 56 then determines whether there are additional color planes to select (120). If there are additional color planes available, the edge sharpening filter 56 then returns to step 102 to select the next color plane. Otherwise, the edge sharpening process 100 completes and the edge sharpening filter 56 outputs the filtered signal created using the Best Filter. The output includes data indicating which filter scheme was used (the Best Filter). Process 100 is only illustrative of the implementation of edge sharpening filter 56. Other suitable implementations are possible.

In the disclosed embodiment, determining the color variance of at least some of the plurality of filter output is performed by counting the number of different color values in the filter output. Color variance can be measured in other ways as well. For example, color variance can be determined by calculating the statistical dispersion of color values in at least a portion of the filter output. Alternatively, similar colors can be counted as one color in performing the count of colors. Alternatively, color variance can be determined by determining if the color values in at least a portion of the filter output include a dominant color value. For example, a histogram of color values can reveal that one color or a range of colors are numerically dominant over other colors.

Figure 6:
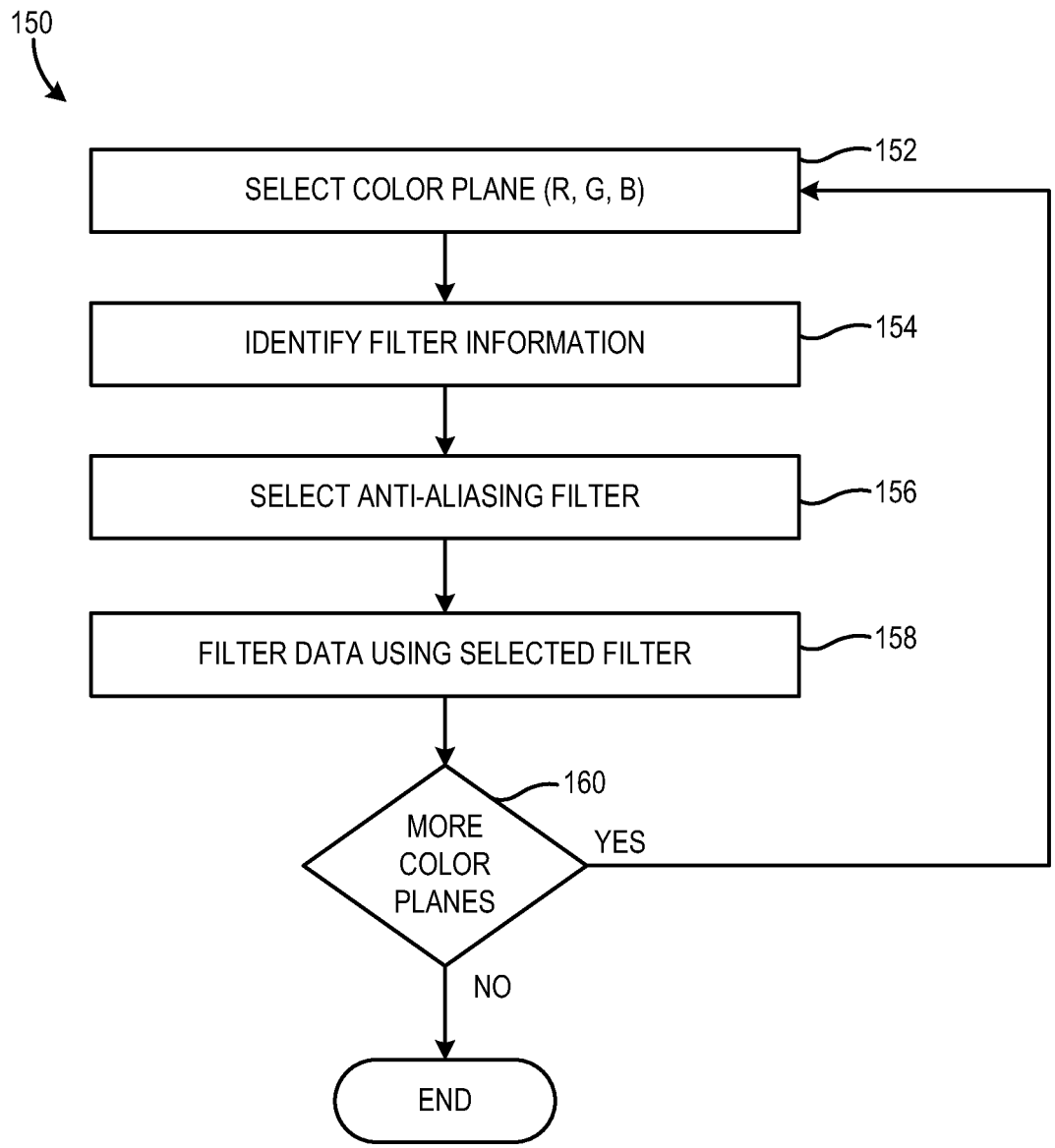
FIG. 6 is an exemplary block diagram of the blurring filter of FIG. 4.

FIG. 6 shows an exemplary block diagram of the process performed by blurring filter 78 on the input signal derived from decoding module 76 (150). The first step in the process is to select a color plane (152). As described above with respect to the edge sharpening filter 56 process 100, color planes may be represented through a number of different methodologies, including, but not limited to, RGB and YCbCr representations. After the color plane is selected, blurring filter 78 determines the filter scheme used from the data included in the input signal by the edge sharpening filter 56 (154).

Blurring filter 78 then applies the selected filter scheme to the input signal to reproduce the original anti-aliased type image for the selected color plane (158). If additional color planes are available in the input signal, the blurring filter 78 returns to step 152 to select another color plane. Otherwise, the blurring filter process 150 completes and the blurring filter 78 then outputs the filtered signal created using the selected filter scheme. Process 150 is only illustrative of the implementation of blurring filter 78. Other suitable implementations are possible.

Figure 7:
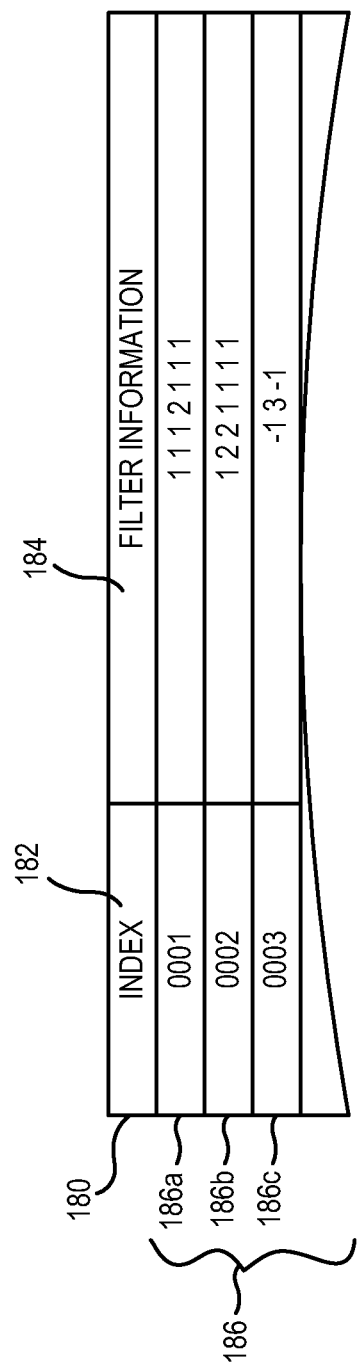
FIG. 7 is an exemplary list of filters used when selecting the filters in FIGS. 5 and 6.

FIG. 7 shows an exemplary list of filter schemes 180 utilized by edge sharpening filter 56 process 100 and blurring filter 78 process 150. The list of filters 180 includes data for an index 182 and a filter information 184.

The index 182 represents the identifying value of a filter. This identifying value can be embedded in the output signal from edge sharpening filter 56 to identify which filter was selected to sharpen the raw input signal 52. Accordingly, the blurring filter 78 can use the same value to select the appropriate reverse filter to recreate the original input signal 52 from the signal derived from the output signal from edge sharpening filter 56.

The filter information 184 represents the scheme of the filter used in the edge sharpening filter 56 to sharpen the input signal 52 and in the blurring filter 78 to blur the signal derived from the output signal from edge sharpening filter 56 (i.e. to reverse the effects of edge sharpening filter 56 to recreate input signal 52). The shown structure and content of list of filters 180 is intended to be illustrative only. Other implementations of list of filters 180 are available.

A Finite Impulse Response (FIR) filter is a type of filter that could be represented by filter information 184. A FIR filter will produce at least one output color value for a target pixel (y[n]) based upon the weighted sum of color values of adjoining pixels. The number of input values to the filter is called the number of "taps." The order of the filter is the number of taps minus one (N). The filter will have a coefficient value associated with each tap position ($b_i$) which indicates the weight assigned to the color value of each input value (x[n]) when calculating the output color value for the target pixel. An FIR filter as described can be expressed mathematically as the following exemplary convolution kernel:

$$y[n] = \sum_{i=0}^{N} b_i x\left[n - i + \frac{N}{2}\right]$$

Rows 186a-c of list 180 contain exemplary filter information (coefficient values) for the exemplary FIR filter described above. Rows 186a and 186b, for example, contain filter information for a filter implementation having seven taps. Row 186c, for example, contains filter information for a filter implementation having three taps. The FIR filter implementation described is intended to be illustrative only. A filter implementation can also include those with five taps or nine taps. Other suitable implementations of the FIR filter and other suitable filters in general are available.

The operation of encoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

The embodiments of transmitting station 12 and/or receiving station 24 (and the algorithms, methods, instructions etc. stored thereon and/or executed thereby) are implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any the foregoing, either singly or in combination. The terms "signal" and "data" are used interchangeably.

Further, portions of transmitting station 12 and receiving station 24 do not necessarily have to be implemented in the same manner. Thus, for example, edge sharpening filter 56 can be implemented in software whereas encoding module 58 can be implemented in hardware. In one embodiment, for example, transmitting station 12 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 24 can, for example, be implemented on computers in a screencasting system. Alternatively, transmitting station 12 can be implemented on a server and receiving station 24 can be implemented on a device separate from the server, such as a handheld communications device (i.e. a cell phone). In this instance, transmitting station 12 can encode content using encoder 50 into encoded video signal 52 and transmit encoded video signal to the communications device. In turn, the communications device can then decode the encoded video signal 52 using decoder 70. Alternatively, the communications device can decode content stored locally on the communications device (i.e. no transmission is necessary). Other suitable transmitting station 12 and receiving station 24 implementation schemes are available. For example, receiving station 24 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, contain, store, communicate, or transport the program for use by or in connection with any computing system or device. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding video data, comprising:
    applying a plurality of filter schemes to at least a portion of an input video signal to generate a plurality of filter outputs, each filter output having data indicating color values included in the filter output;
    determining, by a processor, the color variance of at least some of the plurality of filter outputs;
    selecting at least one of the plurality of filter schemes based on the color variance of the filter output generated using the selected filter scheme;
    encoding the filter output corresponding to the at least one selected filter scheme;
    wherein encoding the filter output corresponding to the at least one selected filter scheme includes:
    generating an encoded signal, the encoded signal including information identifying the at least one selected filter scheme.

2. The method of claim 1, wherein determining the color variance of a filter output further comprises:
    counting the number of different color values in the filter output.

3. The method of claim 1, wherein determining the color variance of a filter outputs further comprises:
    determining the statistical dispersion of color values in at least a portion of the filter output.

4. The method of claim 1, wherein determining the color variance of a filter outputs further comprises:
    determining if the color values in at least a portion of the filter output include a dominant color value.

5. The method of claim 1, wherein the input video signal includes an image that has been anti-aliased using a blurring filter.

6. The method of claim 1, wherein the input video signal includes images of text that have been anti-aliased using a blurring filter.

7. The method of claim 1, wherein the plurality of filter schemes includes at least one edge-sharpening filter.

8. The method of claim 1, wherein the plurality of filter schemes includes convolution kernels having differing numbers of taps.

9. The method of claim 8, wherein the plurality of filter schemes includes filter schemes having 3, 5, 7 and 9 taps.

10. The method of claim 8, wherein the plurality of filter schemes include filter schemes having different weights.

11. The method of claim 1, wherein the portion of the input video signal is a block.

12. The method of claim 1, wherein the portion of the input video signal is a frame.

13. The method of claim 1, wherein the portion of the input video signal is selected based on the sharpness of the image represented by the input video signal.

14. The method of claim 1, wherein applying a plurality of filter schemes to the portion of the input video signal includes applying the plurality of filter schemes to a color plane of the portion of the input video signal.

15. A method for encoding data representing an image that is intended for display on a computer monitor, comprising:
    applying a plurality of filter schemes to at least a portion of an input video signal to generate a plurality of filter outputs;
    identifying, by a processor, a filter output from the plurality of filter outputs that has a low color variance relative to the other filter outputs from the plurality of filter outputs;

generating information identifying the filter scheme used to generate the selected filter output;
wherein a filter output from the plurality of filter outputs includes a plurality of values corresponding to a plurality of pixels; and
encoding the identified filter output.

16. The method of claim 15, wherein:
the input video signal includes a plurality of blocks representing text in the image that has been anti-aliased using a blurring filter; and
the portion of the input video signal includes at least some of the plurality of blocks.

17. The method of claim 15, wherein the plurality of filter schemes includes convolution kernels having differing numbers of taps.

18. A method for reducing the complexity of a data stream to be encoded, comprising:
identifying at least one target block from an input video stream;
obtaining an original set of color values that contains each distinct color value used in the at least one target block;
applying, by a processor, a plurality of filter schemes to the at least one target block to generate a plurality of filter outputs;
determining a filtered set of color values for each of the plurality of filter outputs, each filtered set of color values containing each distinct color value used in its associated filter output;
selecting the filter scheme of the filter output that most reduces the complexity of the at least one target block; and
generating compressed bitstream by encoding the filter output associated with the selected filter scheme.

19. The method of claim 18, further comprising:
determining a difference between the number of color values in the original set of color values and each of the filtered set of color values; and
identifying the filter output that most reduces the complexity of the at least one target block as the filter output that is associated with the filtered set of color values that has the largest difference.

20. The method of claim 18, wherein encoding the filter output associated with the selected filter scheme includes:
encoding a filter information identifier into the compressed bitstream identifying which filter scheme was used to create the filter output in the compressed bitstream.

* * * * *